United States Patent
Burkart et al.

(10) Patent No.: US 11,224,883 B2
(45) Date of Patent: Jan. 18, 2022

(54) DUAL SPRAY PATTERN NOZZLES

(71) Applicant: ICP CONSTRUCTION, INC., Andover, MA (US)

(72) Inventors: Karl W. Burkart, Akron, OH (US); Christopher D. Dolezal, Canton, OH (US); DuJuan J. McClendon, Jr., Akron, OH (US)

(73) Assignee: ICP CONSTRUCTION, INC., Andover, MA (US)

( * ) Notice: Subject to any disclaimer, the term of this patent is extended or adjusted under 35 U.S.C. 154(b) by 0 days.

(21) Appl. No.: 16/140,688

(22) Filed: Sep. 25, 2018

(65) Prior Publication Data

US 2020/0094269 A1    Mar. 26, 2020

(51) Int. Cl.
*B05B 1/16* (2006.01)
*B05B 7/04* (2006.01)
*B05B 7/00* (2006.01)

(52) U.S. Cl.
CPC .............. *B05B 1/16* (2013.01); *B05B 7/0483* (2013.01); *B05B 7/0025* (2013.01); *B05B 7/0075* (2013.01)

(58) Field of Classification Search
CPC ......... B05B 1/16; B05B 1/044; B05B 7/0018; B05B 7/0025; B05B 7/0075; B05B 7/025; B05B 7/04; B05B 7/0408; B05B 7/0416; B05B 7/0425; B05B 7/0483; B05B 7/10; B05B 12/0026; B05B 1/12; B29B 7/7438
USPC .................................. 428/212; 239/DIG. 19
See application file for complete search history.

(56) References Cited

U.S. PATENT DOCUMENTS

| | | | |
|---|---|---|---|
| 919,743 A | 4/1909 | Mason | |
| 1,193,446 A | 8/1916 | Wells | |
| 2,635,010 A | 4/1953 | Sanders et al. | |
| 2,907,591 A | 10/1959 | Gulick | |
| 3,146,950 A | 9/1964 | Lancaster | |
| 3,650,479 A | 3/1972 | Leidberg | |
| 3,838,578 A | 10/1974 | Sakasegawa et al. | |
| 4,128,264 A | 12/1978 | Oldford | |
| 5,242,115 A | 9/1993 | Brown | |
| 5,462,204 A | 10/1995 | Finn et al. | |
| 5,529,245 A | 6/1996 | Brown | |
| 5,846,573 A | 8/1998 | Wurst et al. | |
| 6,079,638 A | 6/2000 | Chang | |
| 6,158,624 A | 12/2000 | Grigg et al. | |
| 6,170,882 B1 | 1/2001 | Prest | |
| 6,182,868 B1 | 2/2001 | Hurray et al. | |
| 6,431,468 B1 | 8/2002 | Brown et al. | |
| 6,561,438 B1 * | 5/2003 | Restive .................. | B05B 7/005 239/310 |
| 7,712,433 B2 | 5/2010 | Lim | |
| 8,177,451 B2 | 5/2012 | Park | |
| 8,529,249 B2 | 9/2013 | Haskin | |

(Continued)

OTHER PUBLICATIONS

Thermal-Oxidative Degradation of Polymers, Jan. 7, 2017, Polymer Database 2015, p. 1 (Year: 2017).*

(Continued)

*Primary Examiner* — Steven M Cernoch
(74) *Attorney, Agent, or Firm* — FisherBroyles, LLP; Louis F. Wagner

(57) ABSTRACT

An applicator having a housing and a nozzle is described, the nozzle being convertible from a first geometric shape to a different second geometric shape by an operator snapping the exterior tip off the nozzle, thereby exposing an interior tip.

10 Claims, 9 Drawing Sheets

(56) References Cited

U.S. PATENT DOCUMENTS

| | | |
|---|---|---|
| 9,211,552 B2 | 12/2015 | Gantenbein |
| 2005/0035220 A1 | 2/2005 | Brown |
| 2006/0192033 A1 | 8/2006 | Dansizen et al. |
| 2007/0095939 A1 | 5/2007 | Saunders et al. |
| 2007/0138216 A1 | 6/2007 | Delaossa |
| 2008/0242774 A1* | 10/2008 | Lahann ................ B82Y 10/00 524/99 |
| 2008/0296398 A1 | 12/2008 | Hickman et al. |
| 2008/0308585 A1* | 12/2008 | Foley ............... B05C 17/00503 222/568 |
| 2009/0306674 A1 | 12/2009 | Chandler |
| 2010/0065130 A1 | 3/2010 | Swab et al. |
| 2011/0089263 A1* | 4/2011 | Hughett ................ E03C 1/0404 239/428.5 |
| 2012/0211528 A1* | 8/2012 | Greeley ................ B05B 11/00 222/383.1 |
| 2014/0048560 A1* | 2/2014 | Bina ..................... B05B 7/0408 222/145.1 |
| 2014/0265303 A1 | 9/2014 | Ismert |
| 2014/0339327 A1 | 11/2014 | Gantenbein et al. |
| 2015/0014372 A1 | 1/2015 | Proud et al. |
| 2016/0228884 A1* | 8/2016 | Sanwald ................ B05B 15/18 |
| 2017/0296757 A1 | 10/2017 | Maeda et al. |
| 2018/0043378 A1 | 2/2018 | Gantenbein et al. |
| 2018/0043379 A1 | 2/2018 | Gantenbein et al. |
| 2018/0043380 A1 | 2/2018 | Gantenbein et al. |

OTHER PUBLICATIONS

Utracki, Leszek A., Polyethylenes and Their Blends, Polymer Blends Handbook 2014, Springer Science+Business Media Dordrecht, p. 1586 (Year: 2014).*

Crosslinking, Sep. 26, 2017, Polymer Science Learning Center, p. 3 (Year: 2017).*

Froth-Pak Ultra Premium Foam Insulation System bearing a copyright date of 2014 on the last page.

Froth-Pak Ultra Premium Foam Insulation Manual bearing an edition date of 2015 on the first page.

International Search Report and Written Opinion for PCT/US2013/52984 dated Dec. 11, 2013.

International Preliminary Report on Patentability for PCT/US2013/52984 dated Jun. 9, 2015.

International Search Report and Written Opinion for PCT/US2019/052683.

International Preliminary Report on Patentability (Chapter I of the PCT) dated Mar. 23, 2021.

* cited by examiner

DUAL SPRAY PATTERN NOZZLES

CROSS-REFERENCE TO RELATED APPLICATIONS

Not Applicable.

TECHNICAL FIELD OF THE INVENTION

The invention described herein relates generally to a one-component or a two-component spray gun nozzle tip that dispenses foam in a first spray pattern as well as a second spray pattern after the operator has removed the outermost spray tip.

BACKGROUND OF THE INVENTION

This invention is particularly suited for in-situ applications of liquid chemicals mixed and dispensed as a spray or a foam and more specifically, to in-situ application of polyurethane foam or froth. In-situ applications for polyurethane foam have continued to increase in recent years extending the application of polyurethane foam beyond its traditional uses in the packaging, insulation and molding fields. For example, polyurethane foam is being used with increasing frequency as a sealant in the building trades for sealing spaces between windows and door frames and the like and as an adhesive for gluing flooring, roof tiles, and the like.

Polyurethane foam for in-situ applications is typically supplied as a "one-component" froth foam or a "two-component" froth foam in portable containers hand carried and dispensed by the operator through either a valve or a gun. However, the chemical reactions producing the polyurethane froth foam in a "one-component" polyurethane foam is significantly different from the chemical reactions producing a polyurethane froth foam in a "two-component" polyurethane foam. Because the reactions are different, the dispensing of the chemicals for a two-component polyurethane foam involves different and additional concepts and concerns than those present in the dispensing apparatus for a "one-component" polyurethane froth foam.

A "one-component" foam generally means that both the resin and the isocyanate used in the foam formulation are supplied in a single pressurized container and dispensed from the container through a valve or a gun attached to the container. When the chemicals leave the valve, a reaction with moisture in the air produces a polyurethane froth or foam. Thus, the design concerns related to an apparatus for dispensing one-component polyurethane foam essentially concerns the operating characteristics of how the one-component polyurethane foam is throttled or metered from the pressurized container. Post drip is a major concern in such applications as well as the dispensing gun not clogging because of reaction of the one component formulation with air (moisture) within the gun. To address or at least partially address such problems, a needle valve seat is typically applied as close to the dispensing point by a metering rod arrangement which can be pulled back for cleaning. While metering can occur at the needle valve seat, the seat is primarily for shut-off to prevent post drip, and depending on gun dimensioning, metering may principally occur at the gun opening.

In contrast, a "two-component" froth foam means that one principal foam component is supplied in one pressurized container, typically the "A" container (i.e., polymeric isocyanate, fluorocarbons, etc.) while the other principal foam component is supplied in a second pressurized container, typically the "B" container (i.e., polyols, catalysts, flame retardants, fluorocarbons, etc.). In a two-component polyurethane foam, the "A" and "B" components form the foam or froth when they are mixed in the gun. Of course, chemical reactions with moisture in the air will also occur with a two-component polyurethane foam after dispensing, but the principal reaction forming the polyurethane foam occurs when the "A" and "B" components are mixed or contact one another in the dispensing gun and/or dispensing gun nozzle. The dispensing apparatus for a two-component polyurethane foam application has to thus address not only the metering design concerns present in a one-component dispensing apparatus, but also the mixing requirements of a two-component polyurethane foam.

Further, a "frothing" characteristic of the foam is enhanced by the pressurized gas employed, e.g., fluorocarbon (or similar) component, which is present in the "A" and "B" components. This fluorocarbon component is a compressed gas which exits in its liquid state under pressure and changes to it gaseous state when the liquid is dispensed into a lower pressure ambient environment, such as when the liquid components exit the gun and enter the nozzle.

While polyurethane foam is well known, the formulation varies considerably depending on application. In particular, while the polyols and isocyanates are typically kept separate in the "B" and "A" containers, other chemicals in the formulation may be placed in either container with the result that the weight or viscosity of the liquids in each container varies as well as the ratios at which the "A" and "B" components are to be mixed. In dispensing gun applications which relate to this invention, the "A" and "B" formulations are such that the mixing ratios are generally kept equal so that the "A" and "B" containers are the same size. However, the weight, more importantly the viscosity, of the liquids in the containers invariably vary from one another. To adjust for viscosity variation between "A" and "B" chemical formulations, the "A" and "B" containers are charged (typically with an inert gas) at different pressures to achieve equal flow rates. The metering valves in a two-component gun, therefore, have to meter different liquids at different pressures at a precise ratio under varying flow rates. For this reason (among others), some dispensing guns have a design where each metering rod/valve is separately adjustable against a separate spring to compensate not only for ratio variations in different formulations but also viscosity variations between the components. The typical two-component dispensing gun in use today can be viewed as two separate one-component dispensing guns in a common housing discharging their components into a mixing chamber or nozzle. This practice, typically leads to operator errors. To counteract this adverse result, the ratio adjustment then has to be "hidden" within the gun, or the design has to be such that the ratio setting is "fixed" in the gun for specific formulations. The gun cost is increased in either event and "fixing" the ratio setting to a specific formulation prevents interchangeability of the dispensing gun.

Another element affecting the operation of a two-component gun is the design of the nozzle. The nozzle is typically a throw away item detachably mounted to the nose of the gun. Nozzle design is important for cross-over and metering considerations in that the nozzle directs the "A" and "B" components to a static mixer within the tip. For example, one gun completely divides the nozzle into two passages by a wall extending from the nozzle nose to the mixer. The wall lessens but does not eliminate the risk of cross-over since the higher pressurized component must travel into the mixer and back to the lower pressure metering valve. Typically nozzles are uniquely designed to orient the aerosol spray in a fan-shaped pattern or a circular pattern, depending on the end geometry of the spray tip. Typically, switching from one spray pattern to the other typically required changing spray tips. When a tip is exchanged, the residual material will solidify and render the nozzle unusable in the future as explained in more detail below.

A still further characteristic distinguishing two-component from one-component gun designs resides in the clogging tendencies of two-component guns. Because the froth foaming reaction commences when the "A" and "B" components contact one another once the gun is used, the static mixer will clog with polyurethane foam or froth formed within the mixer. Therefore the nozzles, which contain the static mixer, are designed as throw away items. In practice, the foam does not instantaneously form within the nozzle upon cessation of metering to the point where the nozzles have to be discarded. Some time must elapse. This is a function of the formulation itself, the design of the static mixer and, all things being equal, the design of the nozzle.

The dispensing gun of the present invention is particularly suited for use in two-component polyurethane foam "kits" typically sold to the building or construction trade. Typically, the kit contains two pressurized "A" and "B" cylinders (130-250 psi), a pair of hoses for connection to the cylinders and a dispensing gun, all of which are packaged in a container constructed to house and carry the components to the site where the foam is to be applied. When the chemicals in the "A" and "B" containers are depleted, the kit is sometimes discarded or the containers can be recycled. The dispensing gun may or may not be replaced. Since the dispensing gun is included in the kit, kit cost considerations dictate that the dispensing gun be relatively inexpensive. Typically, the dispensing gun is made from plastic with minimal usage of machined parts.

The Prior Art dispensing guns are typically "airless" and do not contain provisions for cleaning the gun. That is, a number of dispensing or metering guns or apparatus, particularly those used in high volume foam applications, are equipped or provided with a means or mechanism to introduce air or a solvent for cleaning or clearing the passages in the gun. The use of the term "airless" as used in this patent and the claims hereof means that the dispensing apparatus is not provided with an external, cleaning or purging mechanism.

Within each type of dispensing gun (e.g., one-component dispensing gun, two-component dispensing gun), a metering rod is utilized. The metering rod is a primary shutoff within the dispensing gun that meters or controls dispensing of material. The metering rod is often referred to as a needle or a pin and engages a female type receiver to meter or shutoff flow of chemical (e.g., material, component "A," component "B," etc.). In one-component dispensing guns, a single metering rod is included within a dispensing passage. In two-component dispensing guns, a metering rod is included within each dispensing passage associated with component (e.g., material). In an embodiment, two-component dispensing gun includes first dispensing passage and respective metering rod and second dispensing passage and respective metering rod. Upon use of a trigger, metering rod(s) allow material to be dispensed.

Fabrication of metering rods for dispensing guns include various challenges to produce an efficient dispensing gun at a reasonable price point. Typically, metering rods are fabricated incorporating brass, copper, and other materials (e.g., metallic, non-metallic, etc.). Yet, such materials have increased in cost and, in turn, increased cost of manufacturing dispensing guns. Furthermore, dispensing gun requires a secure mating between receiver and metering rod in order to prevent inconsistent metering (e.g., non-uniform dispensing of material, components, or chemical) and incomplete shut off (in a closed position). Inaccuracy between mating surfaces (e.g., receiver and metering rod) is typically overcome by forcing two elements together during initial assembly and allowing the more malleable of the two elements to take set. This technique is referred to as presetting and typically requires lengthy hold time which limits manufacturing of dispensing guns. Overall, presetting increases the possibility of enabling two mating surfaces to have secure connection (e.g., mating) to avoid leakage and/or non-uniform dispensing but adds to the manufacturing time.

Additionally, metallic metering rods are often fabricated with turning or grinding techniques. In particular, during creation of typical metallic metering rod(s), radial micro grooves are present due to such turning or grinding technique. With repeated use over duration of time, these micro grooves cause wear to the more malleable mating surface. In general, micro grooves grind or file away at the mating surface which can cause leakage of chemical/material at the mating surface.

While two-component dispensing guns discussed above function in a commercially acceptable manner, it is becoming increasingly clear as the number of in-situ applications for polyurethane foam increase, that the range or the ability of the dispensing gun to function for all such applications has to be improved. As a general example, metering rods that meter amount of dispensed material need to be fabricated in a manner that prevent uneven dispensing of materials as well as prevent incomplete shutoff.

Further limitations and disadvantages of conventional, traditional, and proposed approaches will become apparent to one of skill in the art, through comparison of such systems and methods with certain embodiments the claimed invention as set forth in the remainder of the present application with reference to the drawings.

SUMMARY OF THE INVENTION

In one embodiment of the invention, the invention resides in the combination of an applicator (preferably a spray gun) having a housing and a nozzle which comprises: an expanded rear portion of the nozzle for affixing the nozzle to a front of the applicator (preferably spray gun) employing a fastening means; an egress segment of the nozzle at an opposed end from the expanded rear portion of the nozzle, the egress segment comprising: a nozzle tip, the nozzle tip applying the foam or coating in a first spray pattern; a first nozzle segment rearward along a longitudinal axis of the nozzle tip; a fracture zone rearward along the longitudinal axis of the first nozzle segment; a second nozzle segment rearward along the longitudinal axis of the fracture zone; and an optional static mixer interposed between the second nozzle segment and the expanded rear portion of the nozzle; a terminal end of the fracture zone forming a second nozzle tip when the first nozzle segment is removed from the egress segment of the nozzle along the fracture zone, the second nozzle segment spraying foam in a second spray pattern, the second spray pattern being different from the first spray pattern. As used in this application, the qualifier "different" can mean the same geometric shape, but of a different diametered opening, but could also mean a completely different geometric shape from the first shape.

In one aspect of the invention, the fracture zone is a reduced thickness area between the first and second nozzle segments. In another aspect of the invention, the nozzle will have a first nozzle segment and second nozzle segment, each segment comprising a first polymer and a second polymer. The first polymer and the second polymer are preferably at least partially miscible polymers, having at least one Tg between the Tg of the first polymer and the Tg of the second polymer. In a preferred embodiment of the invention, the first polymer and the second polymer are miscible having a single Tg between the Tg of the first polymer and the Tg of the second polymer.

In yet another aspect of the invention, the first polymer and the second polymer are the same, but of different degrees of crosslinking. Often, the first polymer has a higher degree of crosslinking than the second polymer, which has either a reduced degree of crosslinking or no crosslinking.

In a most preferred embodiment, at least a portion of the spray gun nozzle is a polymer, which comprises a color-changeable additive. The color-changeable additive is often a thermochromatic dye.

In still yet another aspect of the invention, the first polymer is soluble in a solvent, and the second polymer is not soluble in that same solvent.

The invention is also directed toward just a nozzle as hereinabove described.

The invention also comprises a method of forming a fracture zone in a nozzle, wherein the nozzle comprises: an egress segment of the nozzle at an opposed end from the expanded rear portion of the nozzle, the egress segment comprising: a nozzle tip, the nozzle tip applying a coating or spraying a foam in a first spray pattern; a first nozzle segment rearward along a longitudinal axis of the nozzle tip; a fracture zone rearward along the longitudinal axis of the first nozzle segment; a second nozzle segment rearward along the longitudinal axis of the fracture zone; and an optional static mixer interposed between the second nozzle segment and the expanded rear portion of the nozzle (the static mixer preferred when applying foams); a terminal end of the fracture zone forming a second nozzle tip when the first nozzle segment is removed from the egress segment of the nozzle along the fracture zone, the second nozzle segment spraying foam in a second spray pattern, the second spray pattern being different from the first spray pattern, and wherein the steps of forming the fracture zone are selected from at least one of: molding the nozzle to have an area of reduced thickness proximate the fracture zone; molding the nozzle using two polymers adjacent the fracture zone, each of the polymers being at least partially miscible with the other polymer; molding the nozzle using the same or similar polymers on either side of the fracture zone, each of the polymers being crosslinked to a different degree; and molding the nozzle using an overmolded polymer over the egress tip of the nozzle.

When the process includes the step of molding the nozzle to have the area of reduced thickness proximate the fracture zone, a mold is employed having an internal pin inserted along a longitudinal axis of the nozzle at the egress tip. When the process includes the step of molding the nozzle to use two polymers adjacent the fracture zone, the mold will employ two internal mold runners to feed each polymer. When the process includes the step of molding the nozzle using the same or similar polymers on either side of the fracture zone, each of the polymers being crosslinked to a different degree involves either adding different amounts of at least one crosslinking agent to each polymer or exposing each polymer to a different degree of radiation crosslinking.

In one embodiment, when the process involves crosslinking, the process includes the step of having a first polymer crosslinked to a higher degree and a second polymer, which has either a reduced degree of crosslinking or no crosslinking. And lastly, when the process includes the step of molding the nozzle using an overmolded polymer, the overmolded polymer and the underlying polymer will be at least partially miscible polymers.

When using overmolding, an essentially circular area in cross-section proximate the fracture zone is preferred and an essentially circular area in cross-section proximate the egress tip. Alternatively, a polygon-shaped area in cross-section (or fan-shaped area) proximate the egress tip may be employed.

The process preferably involves adding a least one thermochromic dye to the nozzle, although two or more thermochromatic dyes may be added for additional visual effects.

These and other advantages and novel features of the claimed invention, as well as details of illustrated embodiments thereof, will be more fully understood from the following description and drawings.

DETAILED DESCRIPTION OF THE INVENTION

The best mode for carrying out the invention will now be described for the purposes of illustrating the best mode known to the applicant at the time of the filing of this application. The examples are illustrative only and not meant to limit the invention, as measured by the scope and spirit of the claims.

As used in this application, the term "miscible" or "partially miscible" means polymers having blending/bonding characteristics as described later in this application.

As used in this application, the term "different" as used in the context of nozzle egress geometric shapes, means a shape which is not the same in some geometric aspect, e.g., a 3-sided polygon shape as contrasted to a 6-sided polygon shape. Alternatively, it means a "fan" shape as contrasted to a "circular shape". In yet another aspect, it means the same geometry, except of different dimensions, e.g., a circular shape having a 1 mm internal diameter opening in comparison to a circular shape having a 2 mm internal diameter opening.

Figure 10:
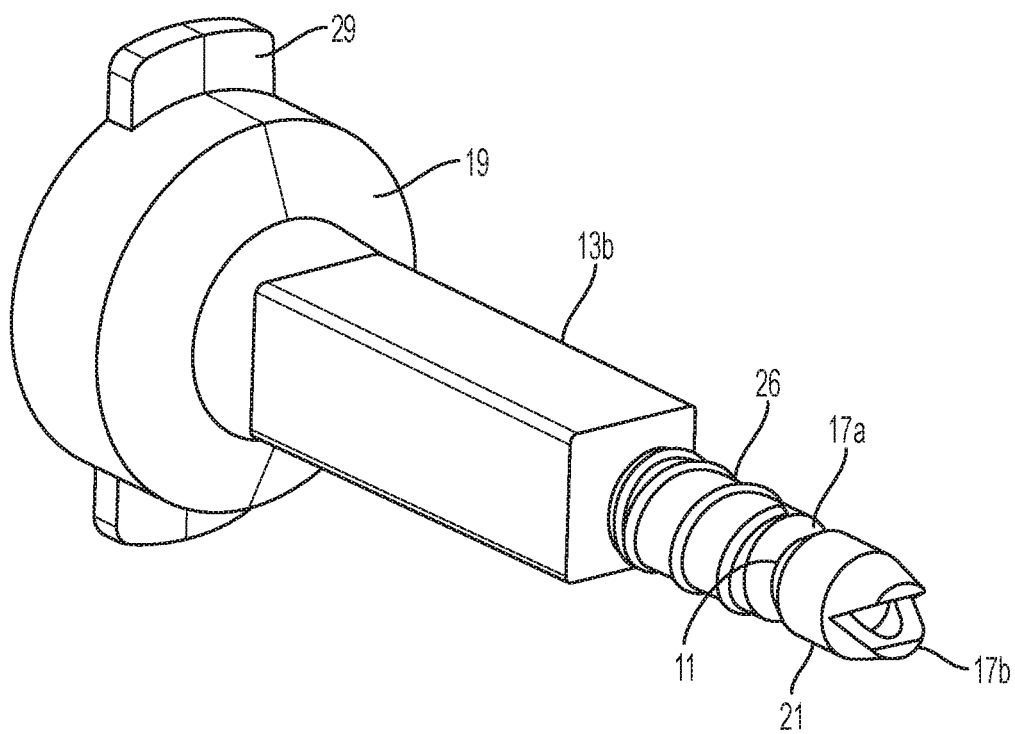
FIG. 10 is a perspective view of a spray tip of the invention with opposed laterally expanding wings to attach the spray tip nozzle to the spray gun body.
Figure 11:
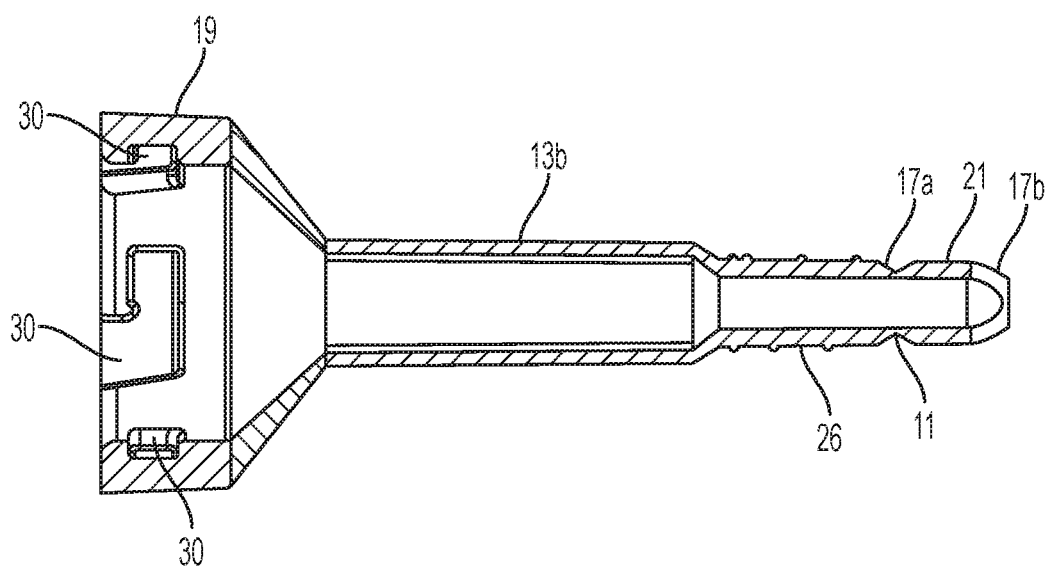
FIG. 11 is a side elevational view of the spray tip illustrating the twist-and-click attachment means for attachment with reduced exterior diameter illustrated.
Figure 12:
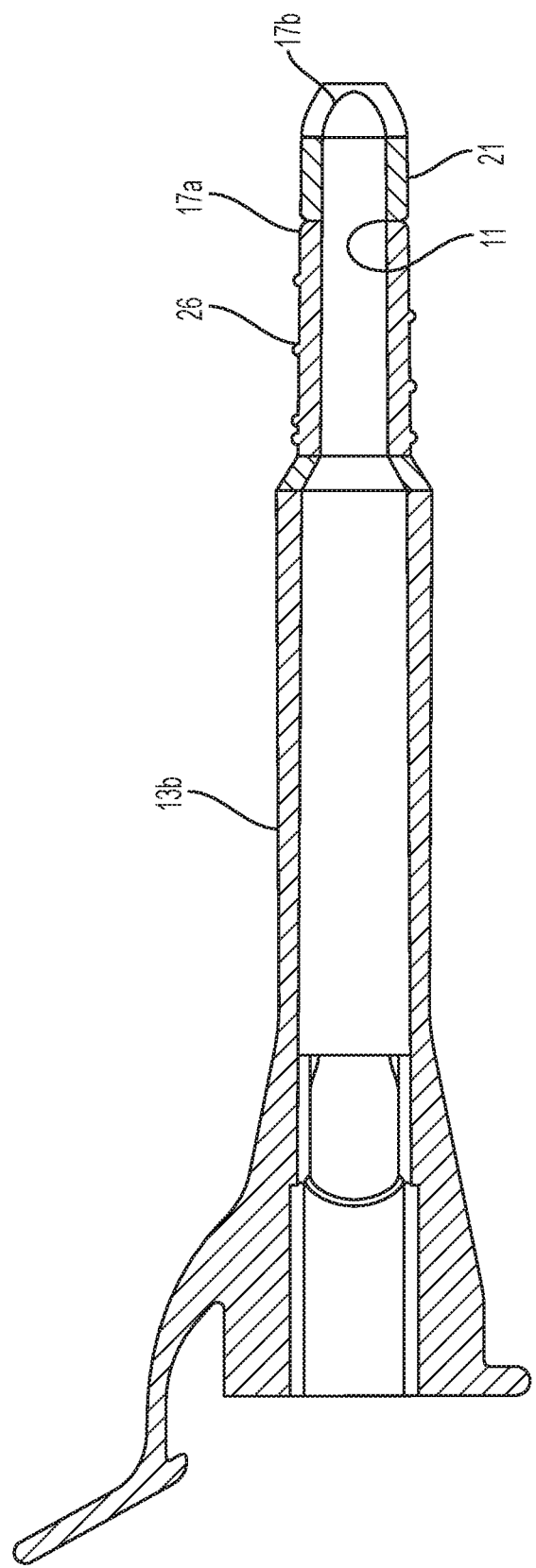
FIG. 12 is a side elevational view of the spray tip illustrating the embodiment where the first and second segments of the tip are comprised of polymers having different amounts of crosslinking.
Figure 13:
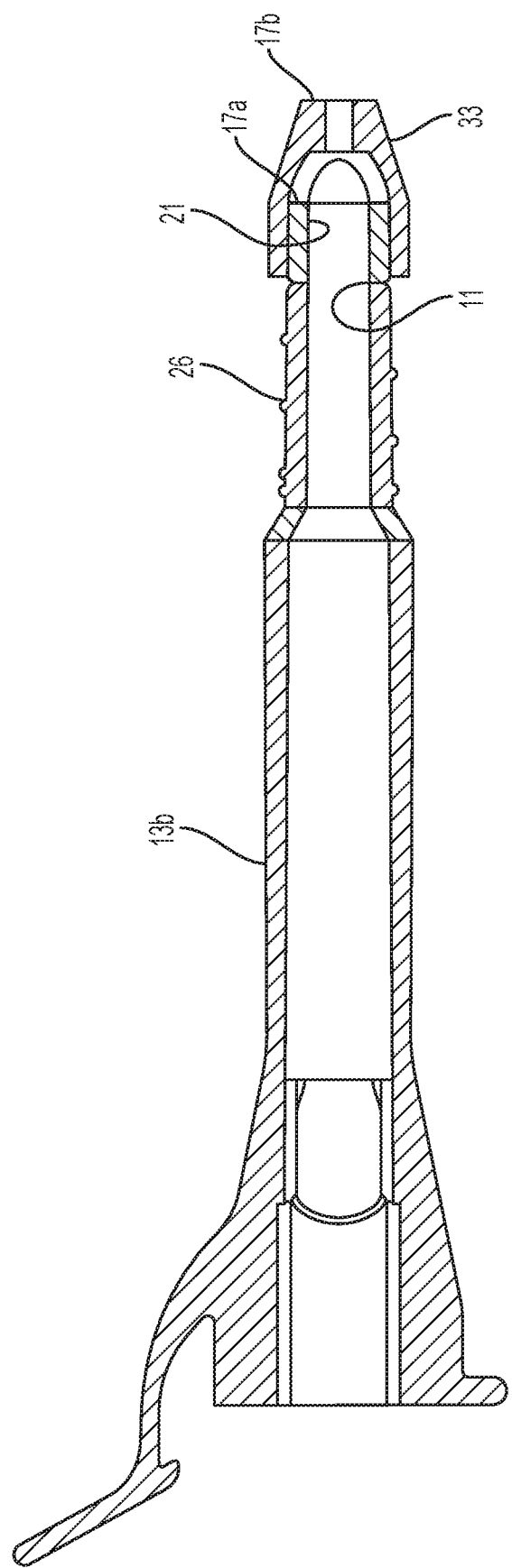
FIG. 13 is a side elevational view of the spray tip illustrating an embodiment where the second segment of the tip (outermost segment) is comprised of an overmolded polymer thereby permitting any geometric configuration for the outermost tip.

As used in this application, the term "fastening means" is illustrated by the various fastening means shown in the Figures, namely the resiliently-biased finger shown in FIGS. 1-2, 4-5, 7, 12-13 or the "twist-and-click" of FIG. 11 or the "wing tab" of FIG. 10 and equivalents thereof.

Figure 1:
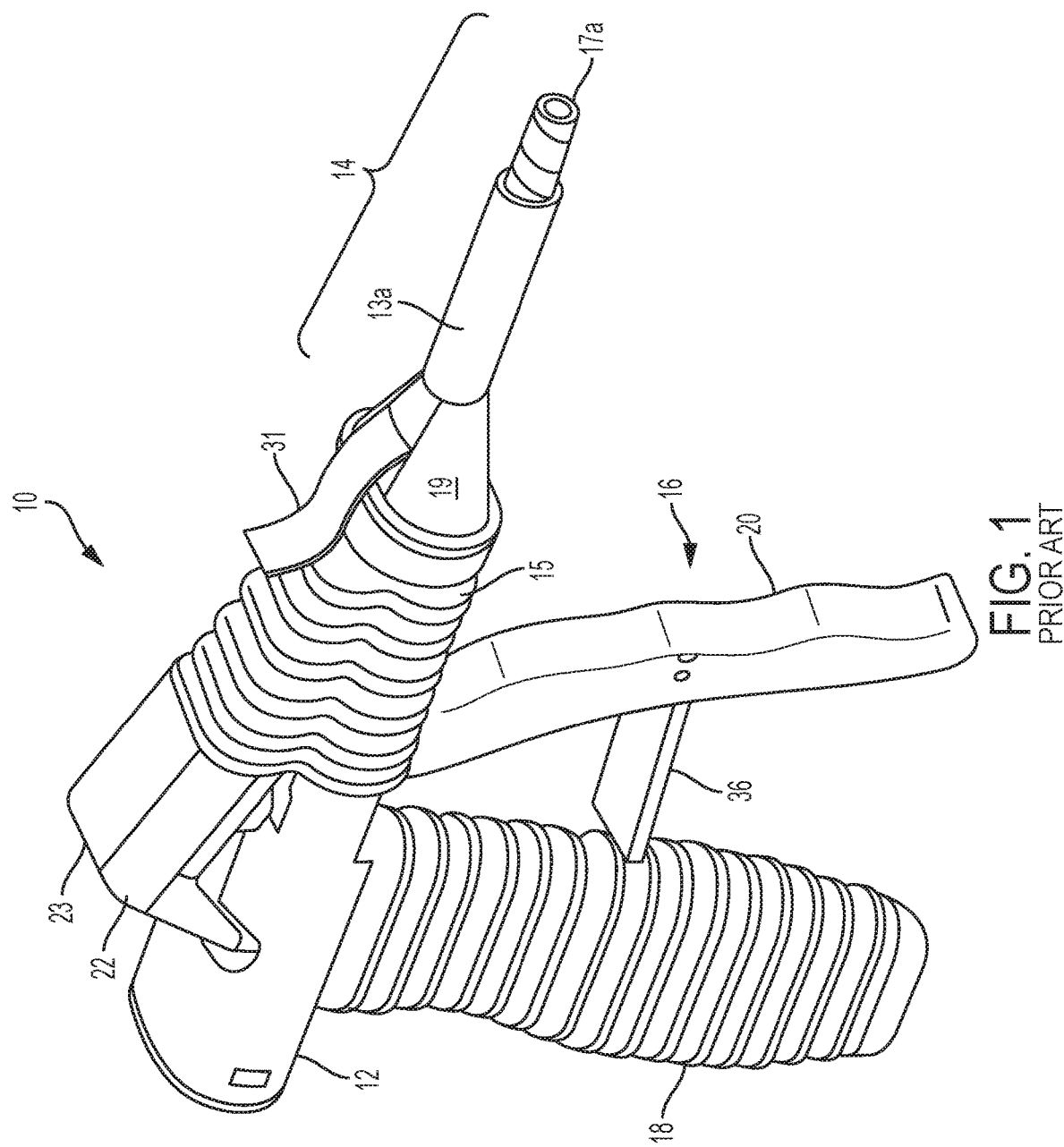
FIG. 1 illustrates a perspective view of a Prior Art two-component foam dispensing gun wherein the removable nozzle tip illustrated a circular spray pattern.

The Prior Art of FIG. 1 illustrates an airless two-component dispensing gun 10. Dispensing gun 10 may be viewed as comprising a one-piece gun body 12 (which includes components to be described) with a detachably secured disposable nozzle 14 (which also includes components to be described). In one preferred embodiment, the gun is molded from polypropylene and the nozzle is molded from an ABS (Acrylonitrile-Butadiene-Styrene) plastic. It is to be appreciated that any suitable plastic material can be utilized for the dispensing gun 10. While one of the objects of the invention is to provide an inexpensive dispensing gun achieved in part by the molding gun body 12 and nozzle 14 from plastic, the invention in its broader sense is not limited to a dispensing gun molded from any particular plastic and in a broader sense, includes metallic dispensing guns and/or dispensing guns with some metallic components. Nozzle 14 is comprised of an expanded entrance collar 19 at a rear of nozzle 14, in fluid communication with a static mixer segment 13a and terminating in an exit tip 17a, which is illustrated to generate a circular spray pattern in FIG. 1.

Gun body 12 may be further defined as having integral portions including a longitudinally-extending valve portion 15 to which nozzle 14 is releasably connected and terminating at a longitudinally-extending trigger portion 16, in turn, terminating at longitudinally-extending spring portion (not shown) from which transversely extends handle portion 18. Within gun body housing 12 is a pair of hose openings 22, 23, canted as shown, to which the "A" and "B" hoses (not shown) are attached, respectively, by conventional quick connect couplings or other retaining mechanisms (e.g., friction fitting O-rings). Dispensing gun 10 is also provided with pivotable trigger 20 extending within trigger body portion 16. It should be appreciated that when the operator grasps dispensing gun 10 about handle 18 for finger actuation of trigger 20, that the position of hose openings 22, 23 is such that the kit hoses will drape over the operator's forearm which is preferred over other conventional hose attachment positions on the dispensing gun. Canting hose openings 22, 23 is thus believed to provide some ergonomic benefit while contributing to the improved performance of dispensing gun 10 as described below. While a canted configuration is illustrated, the invention is not limited to that arrangement, and the "A" and "B" hoses may be positioned to enter the gun from the base of handle 18 (not shown).

Figure 2:
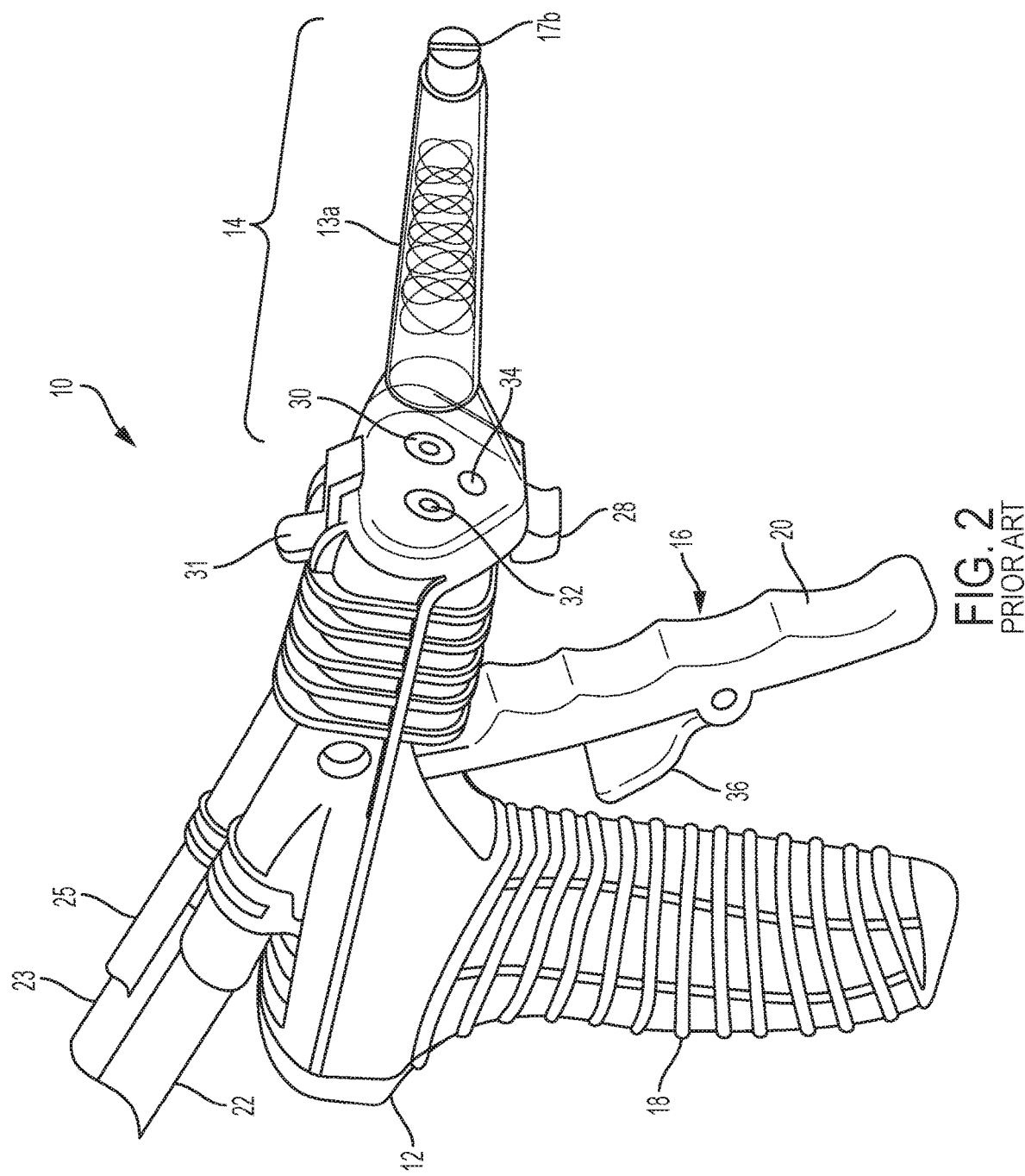
FIG. 2 illustrates a perspective view of another Prior Art two-component foam dispensing gun with an optional third stream, and wherein the removable nozzle is illustrating a vertical fan spray pattern.

Referring now to the Prior Art of FIG. 2, a modified embodiment of FIG. 1 is illustrating and dispensing gun 10 is shown in a manner similar to that illustrated in FIG. 1, in which canting hose openings 22,23 are illustrated to communicate with removable nozzle 14 via openings 32, 30 respectively. Third hose opening 25 also communicates with removable nozzle 14 via opening 34. The value of having a third hose for the dispensing of fluids (gaseous or liquid) is that the user may supplement the options available through the use of this third hose and by control using third stream control trigger 28, may optionally dispense pressurized air (or other gas) to clean a surface upon which foam is to be applied, or to dispense a liquid cleaning medium through the nozzle (e.g., solvent). Wide safety lock 36 is accessed and controlled typically via thumb control by the user. In one aspect of the invention, nozzle 14 is a temperature sensitive nozzle in which the nozzle changes color depending upon the temperature of the dispensed chemicals, thereby permitting the user to visually see if the chemicals are being dispensed at the proper temperature, which at least in part, governs the applied A/B ratio. It is recognized that color-sensitive dyes and pigments may be incorporated into the plastic of nozzle 14. In both Figures, removable nozzle 14 is affixed to the front housing of spray gun 10 by a resiliently biased clip catch mechanism 31. As illustrated in FIG. 2, removable nozzle 14 may have a different-shaped exit tip, 17b, which is illustrated as a vertical fan-shaped pattern and is not limited to a circular-shaped exit tip shown in FIG. 1.

Figure 3:
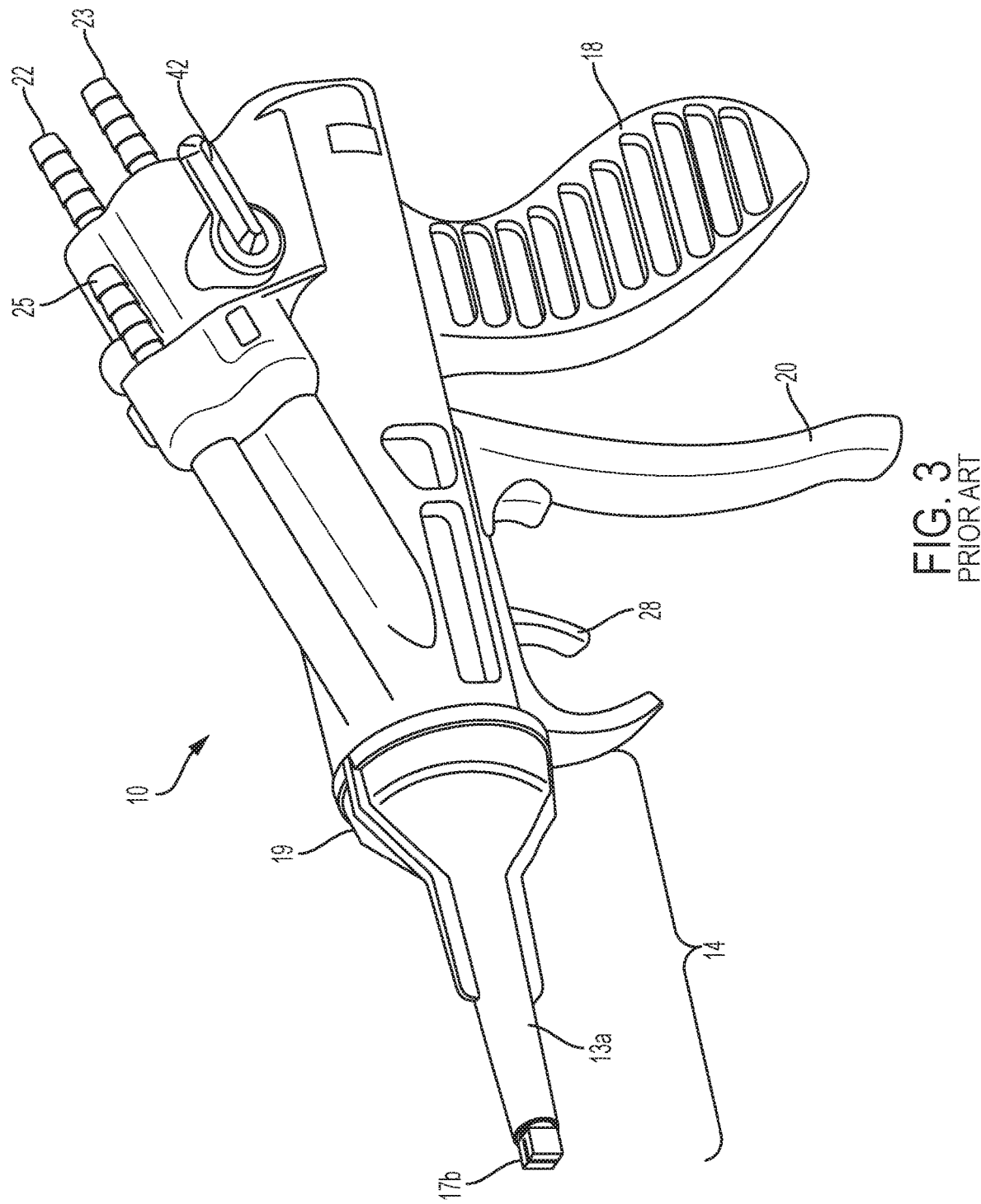
FIG. 3 illustrates a perspective view of yet another Prior Art two-component foam dispensing gun with an optional third stream, and wherein the removable nozzle is illustrating a vertical fan spray pattern, and wherein the removable nozzle is affixed to the front of the housing of the spray gun using a twist-and-click attachment mechanism.

As better illustrated in the Prior Art of FIG. 3, dispensing gun 10 is shown in which removable nozzle 14 is affixed by a "twist and click" mechanism in the expanded collar section 19 and further in which third stream trigger control is provided by pivotable trigger 28 adjacent trigger 20. The dispensing gun is further provided with either an on/off or a high/low output control lever 42 for further control by an operator.

In FIGS. 1-3, an operator must choose between affixing a removable nozzle 14 which has either a circular spray pattern (see 17a of FIG. 1) or a fan-shaped spray pattern (see 17b of FIGS. 2-3). This necessitates that an operator has twice as many nozzles on hand as may be needed. It is even possible that only one of the at least two types of nozzles may be available on-site for the operator, thereby making it impossible to switch spray patterns on-the-fly.

Figure 4:
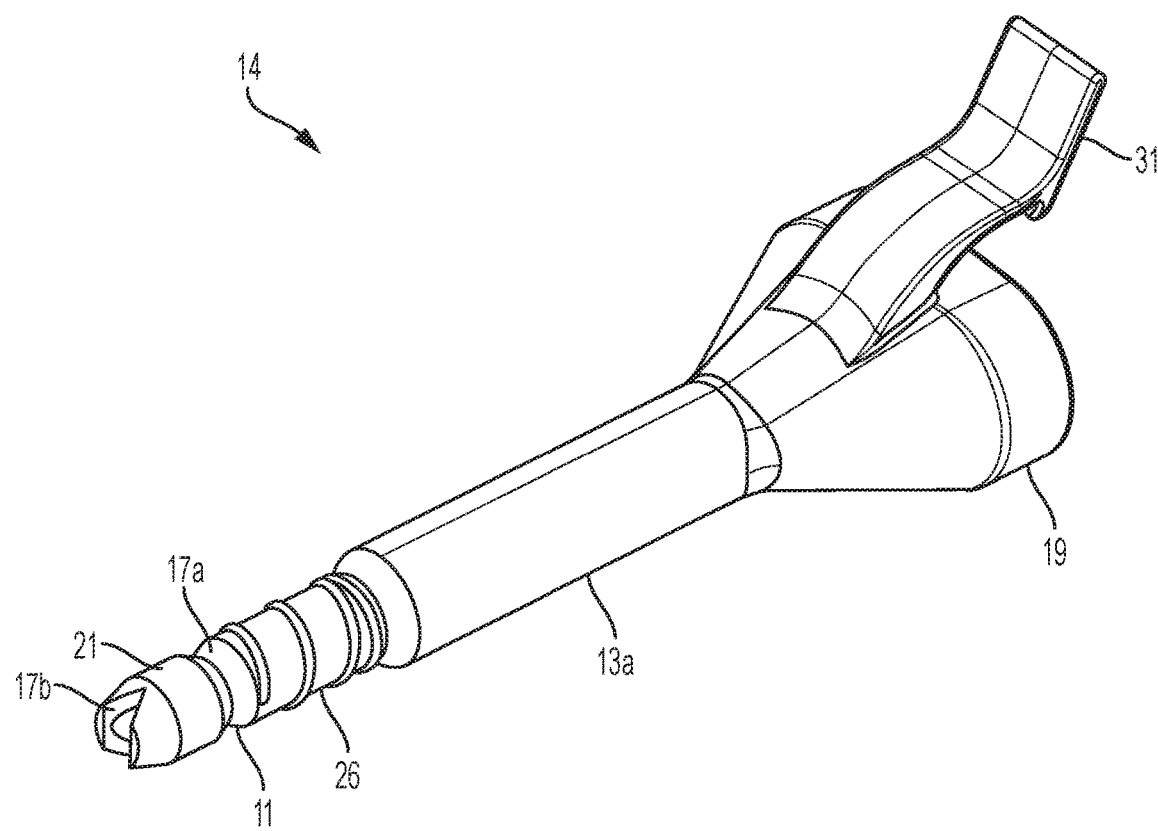
FIG. 4 is a perspective view of the invention wherein the outermost spray tip generates a fan spray pattern and the inner spray tip generates a circular spray pattern when the outermost spray tip has been removed along the fracture zone, the nozzle illustrating a round static mixer.
Figure 5:
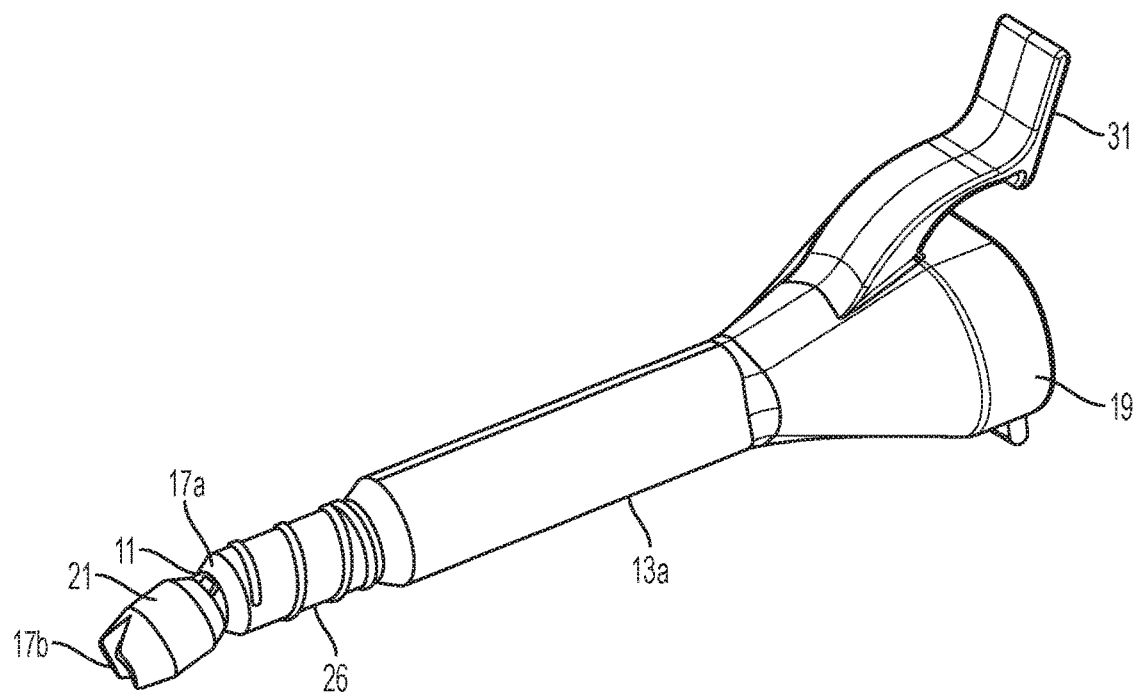
FIG. 5 is a perspective view of the spray tip of FIG. 4 in which the outermost tip is partially torn away.
Figure 6:
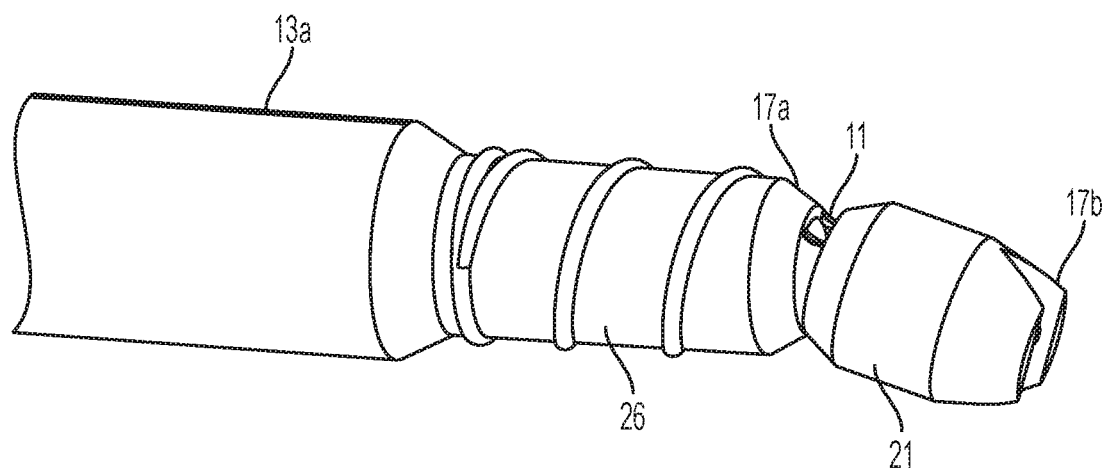
FIG. 6 is an enlarged perspective view of FIG. 5.
Figure 7:
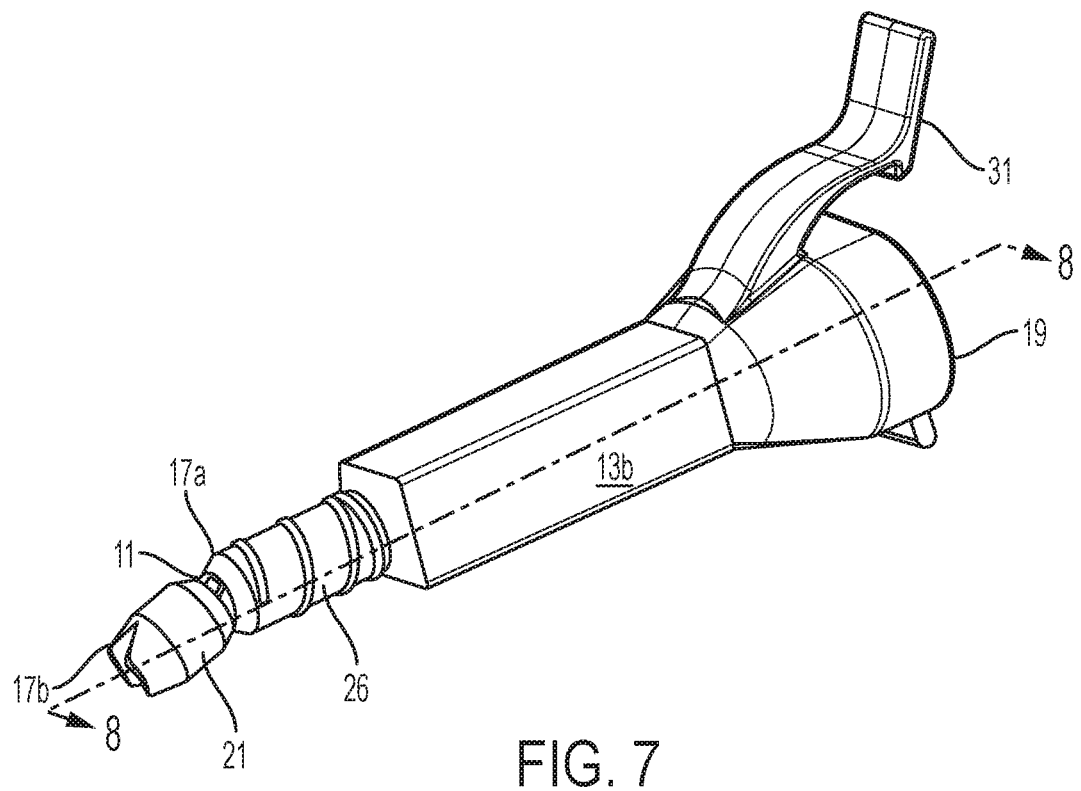
FIG. 7 is a perspective view like FIG. 5 illustrating a square static mixer.
Figure 8:
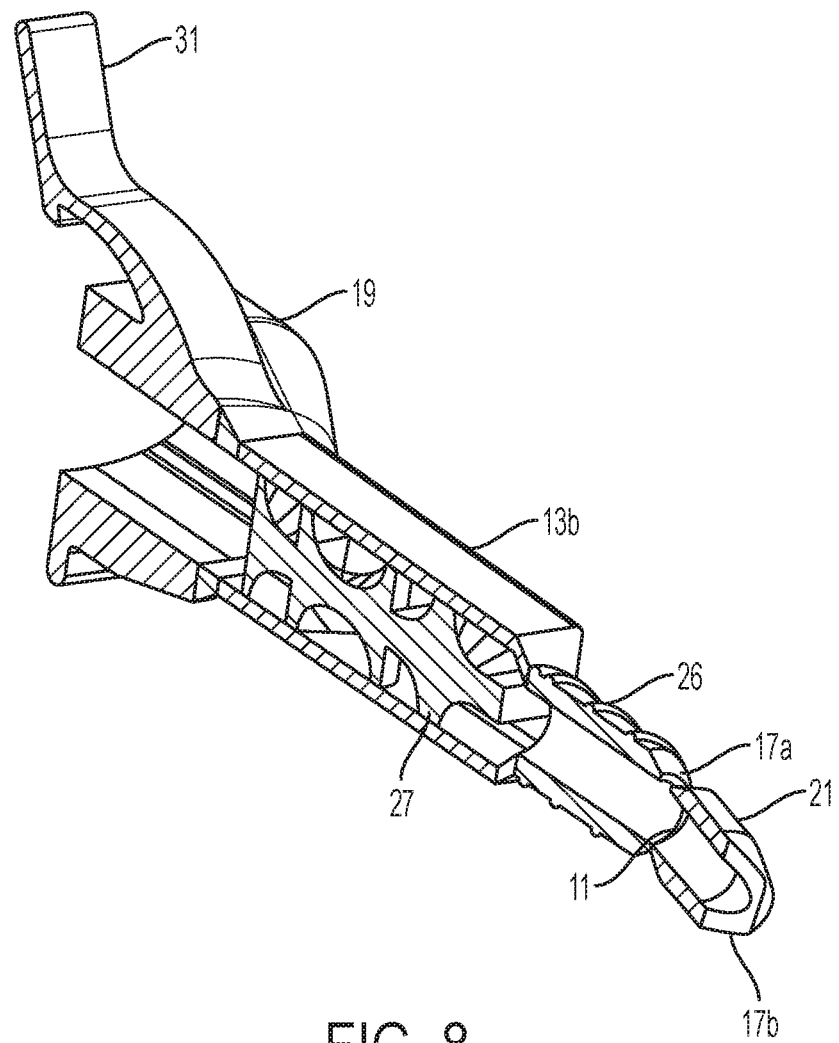
FIG. 8 is a cross-sectional perspective view taken along line 8-8 of FIG. 7.
Figure 9:
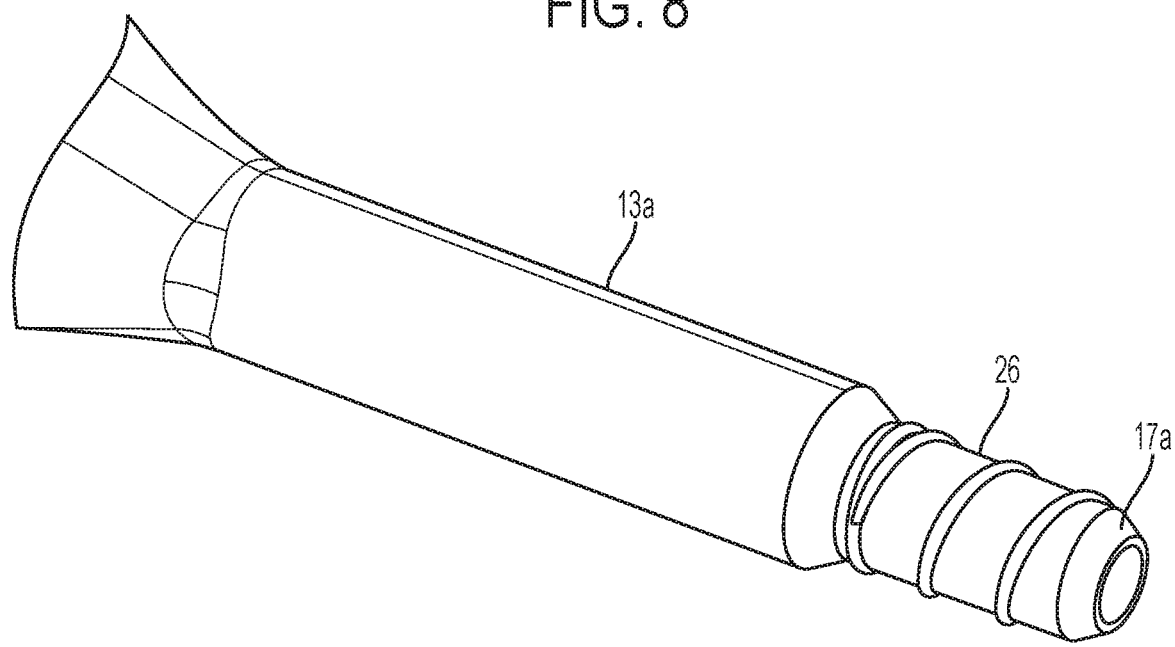
FIG. 9 is an enlarged perspective view of FIG. 5 after the outmost spray tip has been removed.

This problem is solved in the nozzle illustrated in FIG. 4. Removable nozzle 14 is shown having a rear inwardly biased clip 31 for affixing to the gun housing and which further incorporates a "fracture" region 11 (discussed in more detail later) illustrated rearward of fan-shaped tip 17b and before static mixer section 13a along the longitudinal axis of removable nozzle 14. This "fracture" region enables an operator to snap nozzle 14 proximate to fracture region 11 by applying opposing pivotable forces on either side of fracture region 11 and literally snapping forward portion 21 of the nozzle tip off and exposing second nozzle tip 17a of rearward portion 26 of the nozzle thereby permitting the operator to employ a circular spray pattern as illustrated in FIGS. 5-6 & 9. Because the switch from using the nozzle having a fan-shaped spray pattern to a circular spray pattern occurs almost instantly, there is minimal solidification within nozzle 14, and particularly within static mixer 13a, thereby allowing an operator to switch spray patterns on-the-fly.

In switching from a first spray pattern to a second spray pattern, the user will grip forward portion 21 of the nozzle and apply a transverse force to the longitudinal axis of the spray nozzle. This is illustrated in FIG. 5 where the forward portion is illustrated in a partial disengagement position in fracture zone 11. FIG. 6 is an exploded view of FIG. 5 illustrating the start of separation.

While the static mixer has been illustrated a circular in cross-section in FIGS. 1-6, there is no reason to limit the mixer to this geometry. A rectangular static mixer 13*b* is illustrated in FIG. 7 wherein the mixing flights 27 are illustrated in cross-section (see FIG. 8). Also, while a resiliently inwardly-biased clip 31 has been illustrated, there is no need to limit the rearward portion of the nozzle to that geometry. After complete separation of forward portion 21, the spray nozzle will be as illustrated in FIG. 9 and circular spray pattern 17*a* is now the operative spray pattern. As illustrated in FIG. 10, peripherally-extending wings 29 which interface with mating slots is another attachment mechanism as is the twist-and-click slotted mechanism 30 better illustrated in FIG. 11.

As better illustrated in FIG. 12, "fracture" region 11 is illustrated in partial cross-section. While the internal diameter of the spray tip is held constant, the outer diameter is not. Rearward of fan-shaped exit tip 17*b* but forward of static mixer 13*b* is "fracture" region 11. Reducing the outer diameter in this region will create a weakened area in the removable tip which enables an operator to simply apply at least one pivoting transverse force to the longitudinal axis of the nozzle. Preferably the at least one pivoting transverse force is an opposing set of forces on segments 26 and 21, thereby enabling an operator to switch from a fan-shaped spray pattern 17*b* to a circular spray pattern 17*a* with only a momentary delay. By employing only a short amount of time, the synthetic reaction between the polyol(s) and the diisocyanate(s) will not be completed, and the operator may continue using the spray nozzle with the second spray pattern without the nozzle clogging.

However, it should be noted that this "fracture" region in the nozzle may be manufactured in several ways. One approach to achieve the desired result is by thinning the walls of the nozzle. Another approach is to employ a first polymer to manufacture the nozzle 14 from location 11 rearward, while a second similar, but not identical polymer could be used to manufacture the nozzle 14 from location 11 forward. The degree of similarity or dissimilarity between the first and second polymers will control the amount of operator force required to "snap" the nozzle as the degree of bonding is controlled at least in part, by the miscibility of the polymers. Another approach involves crosslinking the two polymers (e.g., polyethylene) to different degrees, e.g., 30-40% in region 21 and 50-65% in region 26. When using one of the approaches which employs similar/dissimilar polymers, the manufacture of the nozzle may employ an injection molding die with an internal pin and at least two runner systems, one to mold the plastic from location 11 rearward and a second to mold the plastic from location 11 forward. In an alternative embodiment, the two polymers may be employed sequentially. Similarly, when employing the crosslinking approach, it is possible for example to synthesize the spray nozzle with a polymer which is crosslinked to a first degree and a second polymer added which is crosslinked to a second degree, the first and second degrees being different. Crosslinked polyethylene is a particularly suitable polymer for this approach, using, e.g., either silane crosslinking or radiation crosslinking.

As better illustrated in FIG. 13, a first polymer is used to mold the entire spray nozzle, including segments 26 and 21 while a different, yet compatible polymer 33 is overmolded essentially on top of segment 21. When the overmolding process is employed, the overmolded polymer will have at least some degree of miscibility with the underlying polymer, as discussed later.

When employing either the different polymer approach or the different degrees of crosslinking as the process for synthesizing the tip, it is possible to have both the outer and inner diameters of the tip remain essentially constant. The breaking of the outer tip to expose the inner tip is achieved by chemistry dissimilarities, rather than mechanical separation action.

When employing the approach in which the first and second polymers are different, there is a need for at least some bonding between the two polymers in fracture zone 11. Polymer blends are often used and can be broadly divided into three categories: immiscible polymer blends (heterogeneous polymer blends): compatible polymer blends: and miscible polymer blends (homogeneous polymer blends). If the blend is immiscible, then it is likely made of two polymers and two glass transition temperatures will be observed. Compatible polymer blends are immiscible polymer blends that exhibit macroscopically uniform physical properties. The macroscopically uniform properties are usually caused by sufficiently strong interactions between the component polymers. Miscible polymer blends are polymer blends that have a single-phase structure. In this case, one glass transition temperature will be observed.

Examples of miscible polymer blends include: homopolymer—homopolymer: e.g., (1) polyphenylene oxide (PPO)—polystyrene (PS) where the miscibility of the two polymers is caused by the presence of an aromatic ring in the repeat units of both chains; and (2) polyethylene terephthalate (PET)—polybutylene terephthalate (PBT); and (3) poly (methyl methacrylate) (PMMA)—polyvinylidene fluoride (PVDF). These blends further include: homopolymer—copolymer: e.g., (1) polypropylene (PP)—EPDM; and (2) polycarbonate (PC)—acrylonitrile butadiene styrene (ABS).

In order to make two polymers mix, it is important to make them have less energy when mixed than they would be separate. But most of the time, the two polymers which are targeted to be blended, will not be miscible. This is not fatal, it simply means that a bit more chemistry is involved. One approach is to use copolymers. Polystyrene doesn't blend with many polymers, but if use of a copolymer is made from styrene and p-(hexafluoro-2-hydroxyisopropyl)styrene, blending is a lot easier. Fluorine atoms are very electronegative, and they're going to draw electrons away from all the nearby atoms. This approach leaves the alcohol hydrogen very lacking in electrons, which means it is left with a partial positive charge. It is known that hydrogen will form strong hydrogen bonds with any group with a partial negative charge. This enables the formation of blends of this copolymer with polycarbonates, poly(methyl methacrylate), and poly(vinyl acetate).

In yet another approach, a blend can be created using for example, a random copolymer of styrene and acrylonitrile. This copolymer will blend with poly(methyl methacrylate) (PMMA). However, PMMA will not blend with either polystyrene or polyacrylonitrile. The random copolymer will blend with PMMA because while the styrene segments and the acrylonitrile segments of the random copolymer may not like PMMA, they like each other even less. The styrene segments are non-polar, while the acrylonitrile segments are very polar. So, the styrene segments and the acrylonitrile segments blend into the PMMA to avoid coming into contact with each other.

For making blends in large amounts, one approach is to heat the two polymers together until they are above the glass transition temperatures of both polymers. At this point they can be mixed. This is often done in machines such as extruders.

A few polymer pairs mix. Most don't. But there are also polymer pairs that sometimes mix and sometimes don't. The variables that one can control to make them mix or not mix are usually temperature and composition. A lot of polymer pairs are only miscible when there is a lot more of one polymer than of the other. There will be a range of compositions for which the two polymers won't mix.

The Hildebrand solubility parameter ($\delta$) is but one measure of a numerical estimate of the degree of interaction between materials, and can be a good indication of solubility, particularly for nonpolar materials such as many polymers. There are other metrics which could be employed. Materials with similar values of $\delta$ are likely to be miscible. The Hildebrand solubility parameter is the square root of the cohesive energy density:

$$\delta = \sqrt{\frac{\Delta H_v - RT}{V_m}}$$

The cohesive energy density is the amount of energy needed to completely remove unit volume of molecules from their neighbors to infinite separation (an ideal gas). This is equal to the heat of vaporization of the compound divided by its molar volume in the condensed phase. In order for a material to dissolve, these same interactions need to be overcome as the molecules are separated from each other and surrounded by the solvent. Materials with similar solubility parameters will be able to interact with each other, resulting in solvation, miscibility or swelling.

The conventional units for the solubility parameter are (calories per cm$^3$)$^{1/2}$, or cal$^{1/2}$ cm$^{-3/2}$. The SI units are J$^{1/2}$ m$^{-3/2}$, equivalent to the pascal$^{1/2}$ and wherein 1 calorie is equal to 4.184 J.

Another approach to determining miscibility is by use of the Free Energy equation which provides another definition of what miscibility means in terms of thermodynamics; from it the state of miscibility of a polymer pair cannot be obtained.

$$\Delta G_M = \Delta H_M - T \Delta S_M$$

The most common method to establish polymer miscibility is Differential Scanning calorimetry (DSC), with which determination of the glass transition temperature (Tg) or the depression of the melting temperature allow one to obtain details of the mixing.

Completely miscible blends consist of one homogeneous phase. This type of blend exhibits only one glass transition temperature ($T_g$), which is between the $T_g$ s of both blend components with a close relation to the blend composition.

The miscibility of homopolymer/copolymer blends has been successfully described by the binary interaction model. The most common specific intermolecular interactions occurring between two different polymer chains are: hydrogen bond, ionic bond and dipole-dipole interactions The criteria for determining whether or not two polymers are miscible are now well established. One common method used for establishing miscibility in polymer-polymer blends or partial phase mixing in such blends is through determination of the glass transition (or transitions) in the blend versus those of the unblended constituents. A miscible polymer blend will usually exhibit a single glass transition Tg between the Tg's of the components. With cases of limited miscibility, two separate transitions $Tg^1$ and $Tg^2$ between those of the constituents may result, typically depicting two phases, a phase rich in the first component and a second phase rich in the second component. A partially miscible blend of the first and second polymer blends is characterized by more than one glass transition temperature Tg, but at a location between $Tg^1$ and $Tg^2$.

In yet another aspect of the invention, separation between regions 21 and 26 is effected by selective dissolution in a solvent in which the polymer of region 21 is soluble whereas the polymer of region 26 is not. For example, if region 21 is overmolded with polystyrene, then simply dipping the nozzle in acetone will reveal the second geometry, provided that region 26 is either not soluble in acetone, or minimally soluble in acetone.

The overmolding approach enables the manufacturer to use a first geometric shape for the tip which is formed by removal at fracture zone 11 while having a tip with a second geometric shape at the extremity. The second geometric shape may be similar or dissimilar to the first geometric shape, depending on the shape of the cavity of the mold. Therefore, overmolding can be employed to result in a tip which has two circular geometries for the tip, the diameters being different, or the tip could have two geometries which are completely different (e.g., circular at fracture zone 11 and oval or polygon-shaped at exit 17b).

The color-changing aspects of the invention above, use thermochromism which is typically implemented via one of two common approaches: liquid crystals and leuco dyes. Liquid crystals are used in precision applications, as their responses can be engineered to accurate temperatures, but their color range is limited by their principle of operation. Leuco dyes allow wider range of colors to be used, but their response temperatures are more difficult to set with accuracy.

Some liquid crystals are capable of displaying different colors at different temperatures. This change is dependent on selective reflection of certain wavelengths by the crystalline structure of the material, as it changes between the low-temperature crystalline phase, through anisotropic chiral or twisted nematic phase, to the high-temperature isotropic liquid phase. Only the nematic mesophase has thermochromic properties. This restricts the effective temperature range of the material.

The twisted nematic phase has the molecules oriented in layers with regularly changing orientation, which gives them periodic spacing. The light passing through the crystal undergoes Bragg diffraction on these layers, and the wavelength with the greatest constructive interference is reflected back, which is perceived as a spectral color. A change in the crystal temperature can result in a change of spacing between the layers and therefore in the reflected wavelength. The color of the thermochromic liquid crystal can therefore continuously range from non-reflective (black) through the spectral colors to black again, depending on the temperature. Typically, the high temperature state will reflect blue-violet, while the low-temperature state will reflect red-orange. Since blue is a shorter wavelength than red, this indicates that the distance of layer spacing is reduced by heating through the liquid-crystal state.

Some such materials are cholesteryl nonanoate or cyanobiphenyls. Liquid crystals used in dyes and inks often come microencapsulated, in the form of suspension. Liquid crystals are used in applications where the color change has to be accurately defined.

Thermochromic dyes are based on mixtures of leuco dyes with suitable other chemicals, displaying a color change (usually between the colorless leuco form and the colored form) in dependence on temperature. The dyes are rarely applied on materials directly; they are usually in the form of microcapsules with the mixture sealed inside. An illustrative example would include microcapsules with crystal violet lactone, weak acid, and a dissociable salt dissolved in dodecanol; when the solvent is solid, the dye exists in its lactone leuco form, while when the solvent melts, the salt dissociates, the pH inside the microcapsule lowers, the dye becomes protonated, its lactone ring opens, and its absorption spectrum shifts drastically, therefore it becomes deeply violet. In this case the apparent thermochromism is in fact halochromism.

The dyes most commonly used are spirolactones, fluorans, spiropyrans, and fulgides. The weak acids include bisphenol A, parabens, 1,2,3-triazole derivates, and 4-hydroxycoumarin and act as proton donors, changing the dye molecule between its leuco form and its protonated colored form; stronger acids would make the change irreversible.

Leuco dyes have less accurate temperature response than liquid crystals. They are suitable for general indicators of approximate temperature. They are usually used in combination with some other pigment, producing a color change between the color of the base pigment and the color of the pigment combined with the color of the non-leuco form of the leuco dye. Organic leuco dyes are available for temperature ranges between about 23° F. (−5° C.) and about 140° F. (60° C.), in wide range of colors. The color change usually happens in about a 5.4° F. (3° C.) interval.

The size of the microcapsules typically ranges between 3-5 μm (over 10 times larger than regular pigment particles), which requires some adjustments to printing and manufacturing processes.

Thermochromic paints use liquid crystals or leuco dye technology. After absorbing a certain amount of light or heat, the crystalline or molecular structure of the pigment reversibly changes in such a way that it absorbs and emits light at a different wavelength than at lower temperatures.

The thermochromic dyes contained either within or affixed upon either the disposable nozzle or hoses may be configured to change the color of the composition in various ways. For example, in one embodiment, once the composition reaches a selected temperature, the composition may change from a base color to a white color or a clear color. In another embodiment, a pigment or dye that does not change color based on temperature may be present for providing a base color. The thermochromic dyes, on the other hand, can be included in order to change the composition from the base color to at least one other color.

In one particular embodiment, the plurality of thermochromic dyes are configured to cause the cleansing composition to change color over a temperature range of at least about 3° C., such as at least about 5° C., once the composition is heated to a selected temperature. For example, multiple thermochromic dyes may be present within the cleansing composition so that the dyes change color as the composition gradually increases in temperature. For instance, in one embodiment, a first thermochromic dye may be present that changes color at a temperature of from about 23° C. to about 28° C. and a second thermochromic dye may be present that changes color at a temperature of from about 27° C. to about 32° C. If desired, a third thermochromic dye may also be present that changes color at a temperature of from about 31° C. to about 36° C. In this manner, the cleansing composition changes color at the selected temperature and then continues to change color in a stepwise manner as the temperature of the composition continues to increase. It should be understood that the above temperature ranges are for exemplary and illustrative purposes only.

Any thermochromic substance that undergoes a color change at the desired temperature may generally be employed in the present disclosure. For example, liquid crystals may be employed as a thermochromic substance in some embodiments. The wavelength of light ("color") reflected by liquid crystals depends in part on the pitch of the helical structure of the liquid crystal molecules. Because the length of this pitch varies with temperature, the color of the liquid crystals is also a function of temperature. One particular type of liquid crystal that may be used in the present disclosure is a liquid crystal cholesterol derivative. Exemplary liquid crystal cholesterol derivatives may include alkanoic and aralkanoic acid esters of cholesterol, alkyl esters of cholesterol carbonate, cholesterol chloride, cholesterol bromide, cholesterol acetate, cholesterol oleate, cholesterol caprylate, cholesterol oleyl-carbonate, and so forth. Other suitable liquid crystal compositions are possible and contemplated within the scope of the invention.

In addition to liquid crystals, another suitable thermochromic substance that may be employed in the present disclosure is a composition that includes a proton accepting chromogen ("Lewis base") and a solvent. The melting point of the solvent controls the temperature at which the chromogen will change color. More specifically, at a temperature below the melting point of the solvent, the chromogen generally possesses a first color (e.g., red). When the solvent is heated to its melting temperature, the chromogen may become protonated or deprotonated, thereby resulting in a shift of the absorption maxima. The nature of the color change depends on a variety of factors, including the type of proton-accepting chromogen utilized and the presence of any additional temperature-insensitive chromogens. Regardless, the color change is typically reversible.

Although not required, the proton-accepting chromogen is typically an organic dye, such as a leuco dye. In solution, the protonated form of the leuco dye predominates at acidic pH levels (e.g., pH of about 4 or less). When the solution is made more alkaline through deprotonation, however, a color change occurs. Of course, the position of this equilibrium may be shifted with temperature when other components are present. Suitable and non-limiting examples of leuco dyes for use in the present disclosure may include, for instance, phthalides; phthalanes; substituted phthalides or phthalanes, such as triphenylmethane phthalides, triphenylmethanes, or diphenylmethanes; acyl-leucomethylene blue compounds; fluoranes; indolylphthalides, spiropyranes; cumarins; and so forth. Exemplary fluoranes include, for instance, 3,3'-dimethoxyfluorane, 3,6-dimethoxyfluorane, 3,6-di-butoxyfluorane, 3-chloro-6-phenylamino-flourane, 3-diethylamino-6-dimethylfluorane, 3-diethylamino-6-methyl-7-chlorofluorane, and 3-diethyl-7,8-benzofluorane, 3,3'-bis-(p-dimethyl-aminophenyl)-7-phenylaminofluorane, 3-diethylamino-6-methyl-7-phenylamino-fluorane, 3-diethylamino-7-phenyl-aminofluorane, and 2-anilino-3-methyl-6-diethylamino-fluorane. Likewise, exemplary phthalides include 3,3',3"-tris(p-dimethylamino-phenyl)phthalide, 3,3'-bis(p-dimethyl-aminophenyl)phthalide, 3,3-bis(p-diethylamino-phenyl)-6-dimethylamino-phthalide, 3-(4-diethylaminophenyl)-3-(1-ethyl-2-methylindol-3-yl)phthalide, and 3-(4-diethylamino-2-methyl)phenyl-3-(1,2-dimethylindol-3-yl)phthalide.

Although any solvent for the thermochromic dye may generally be employed in the present disclosure, it is typically desired that the solvent have a low volatility. For example, the solvent may have a boiling point of about 150° C. or higher, and in some embodiments, from about 170° C. to 280° C. Likewise, the melting temperature of the solvent is also typically from about 25° C. to about 40° C., and in some embodiments, from about 30° C. to about 37° C. Examples of suitable solvents may include saturated or unsaturated alcohols containing about 6 to 30 carbon atoms, such as octyl alcohol, dodecyl alcohol, lauryl alcohol, cetyl alcohol, myristyl alcohol, stearyl alcohol, behenyl alcohol, geraniol, etc.; esters of saturated or unsaturated alcohols containing about 6 to 30 carbon atoms, such as butyl stearate, methyl stearate, lauryl laurate, lauryl stearate, stearyl laurate, methyl myristate, decyl myristate, lauryl myristate, butyl stearate, lauryl palmitate, decyl palmitate, palmitic acid glyceride, etc.; azomethines, such as benzylideneaniline, benzylidenelaurylamide, o-methoxybenzylidene laurylamine, benzylidene p-toluidine, p-cumylbenzylidene, etc.; amides, such as acetamide, stearamide, etc.; and so forth.

The thermochromic composition may also include a proton-donating agent (also referred to as a "color developer") to facilitate the reversibility of the color change. Such proton-donating agents may include, for instance, phenols, azoles, organic acids, esters of organic acids, and salts of organic acids. Exemplary phenols may include phenylphenol, bisphenol A, cresol, resorcinol, chlorolucinol, b-naphthol, 1,5-dihydroxynaphthalene, pyrocatechol, pyrogallol, trimer of p-chlorophenol-formaldehyde condensate, etc. Exemplary azoles may include benzotriaoles, such as 5-chlorobenzotriazole, 4-laurylaminosulfobenzotriazole, 5-butylbenzotriazole, dibenzotriazole, 2-oxybenzotriazole, 5-ethoxycarbonylbenzotriazole, etc.; imidazoles, such as oxybenzimidazole, etc.; tetrazoles; and so forth. Exemplary organic acids may include aromatic carboxylic acids, such as salicylic acid, methylenebissalicylic acid, resorcylic acid, gallic acid, benzoic acid, p-oxybenzoic acid, pyromellitic acid, b-naphthoic acid, tannic acid, toluic acid, trimellitic acid, phthalic acid, terephthalic acid, anthranilic acid, etc.; aliphatic carboxylic acids, such as stearic acid, 1,2-hydroxystearic acid, tartaric acid, citric acid, oxalic acid, lauric acid, etc.; and so forth. Exemplary esters may include alkyl esters of aromatic carboxylic acids in which the alkyl moiety has 1 to 6 carbon atoms, such as butyl gallate, ethyl p-hydroxybenzoate, methyl salicylate, etc.

The amount of the proton-accepting chromogen employed may generally vary, but is typically from about 2 wt. % to about 20 wt. %, and in some embodiments, from about 5 to about 15 wt. % of the thermochromic substance. Likewise, the proton-donating agent may constitute from about 5 to about 40 wt. %, and in some embodiments, from about 10 wt. % to about 30 wt. % of the thermochromic substance. In addition, the solvent may constitute from about 50 wt. % to about 95 wt. %, and in some embodiments, from about 65 wt. % to about 85 wt. % of the thermochromic composition.

Regardless of the particular thermochromic substance employed, it may be microencapsulated to enhance the stability of the substance during processing. For example, the thermochromic substance may be mixed with a thermosetting resin according to any conventional method, such as interfacial polymerization, in-situ polymerization, etc. The thermosetting resin may include, for example, polyester resins, polyurethane resins, melamine resins, epoxy resins, diallyl phthalate resins, vinylester resins, and so forth. The resulting mixture may then be granulated and optionally coated with a hydrophilic macromolecular compound, such as alginic acid and salts thereof, carrageenan, pectin, gelatin and the like, semisynthetic macromolecular compounds such as methylcellulose, cationized starch, carboxymethylcellulose, carboxymethylated starch, vinyl polymers (e.g., polyvinyl alcohol), polyvinylpyrrolidone, polyacrylic acid, polyacrylamide, maleic acid copolymers, and so forth. The resulting thermochromic microcapsules typically have a size of from about 1 to about 50 micrometers, and in some embodiments, from about 3 to about 15 micrometers. Various other microencapsulation techniques may also be used.

Thermochromic dyes are commercially available from various sources. In one embodiment, for instance, thermochromic dyes marketed by Chromadic creations, Hamilton, Ontario and sold under the trade name SpectraBurst Thermochromic Polypropylene.

The thermochromic dyes can be present in the composition in an amount sufficient to have a visual effect on the color of the composition. The amount or concentration of the dyes can also be increased or decreased depending upon the desired intensity of any color. In general, the thermochromic dyes may be present in the composition in an amount from about 0.01% by weight to about 9% by weight, such as from about 0.1% by weight to about 3% by weight. For instance, in one particular embodiment, the thermochromic dyes may be present in an amount from about 0.3% to about 1.5% by weight.

As described above, thermochromic dyes typically change from a specific color to clear at a certain temperature, e.g., dark blue below 60° F. (15.6° C.) to transparent or translucent above 60° F. (15.6° C.). If desired, other pigments or dyes can be added to the composition in order to provide a background color that remains constant independent of the temperature of the composition. By adding other pigments or dyes in combination with the thermochromic dyes to the composition, the thermochromic dyes can provide a color change at certain temperatures rather than just a loss of color should the thermochromic dye become clear. For instance, a non-thermochromic pigment, such as a yellow pigment, may be used in conjunction with a plurality of thermochromic dyes, such as a red dye and a blue dye. When all combined together, the cleansing composition may have a dark color. As the composition is increased in temperature, the red thermochromic dye may turn clear changing the color to a green shade (a combination of yellow and blue). As the temperature further increases, the blue thermochromic dye turns clear causing the composition to turn yellow.

It should be understood, that all different sorts of thermochromic dyes and non-thermochromic pigments and dyes may be combined to produce a composition having a desired base color and one that undergoes desired color changes. The color changes, for instance, can be somewhat dramatic and fanciful. For instance, in one embodiment, the composition may change from green to yellow to red.

In an alternative embodiment, however, the composition can contain different thermochromic dyes all having the same color. As the temperature of the composition is increased, however, the shade or intensity of the color can change. For instance, the composition can change from a vibrant blue to a light blue to a clear color. In addition to the above, many alterations and permutations are possible. Any of a variety of colors and shades can be mixed to undergo color changes as a function of temperature.

While the above invention has been described with particularity to spray foam applications, using blowing agents, there is no need to limit the invention to such, and in fact, any coating may be applied, with minor variations known to those having ordinary skill-in-the-art. For instance, polyurethane coatings may be applied to surfaces in the manner described without the need for a static mixer for example. The same applies to many other coatings. For these applications, the invention reduces to: in combination, an applicator having a housing and a nozzle which comprises: an expanded rear portion of the nozzle for affixing the nozzle to a front of the housing employing a fastening means; an egress segment of the nozzle at an opposed end from the expanded rear portion of the nozzle, the egress segment comprising: a nozzle tip at an egress end of the nozzle, the nozzle tip applying a foam or a coating in a first pattern; a first nozzle segment rearward along a longitudinal axis of the nozzle tip; a fracture zone rearward along the longitudinal axis of the first nozzle segment; a second nozzle segment rearward along the longitudinal axis of the fracture zone; and a terminal end of the fracture zone forming a second nozzle tip when the first nozzle segment is removed from the egress segment of the nozzle along the fracture zone, the second nozzle segment applying the foam or the coating in a second pattern, the second pattern being different from the first pattern.

In one embodiment, the fracture zone is a reduced thickness area between the first and second nozzle segments and in which the first nozzle segment and second nozzle segment comprise a first polymer and a second polymer. Often, the first polymer and the second polymer are at least partially miscible polymers, having at least one Tg between the Tg of the first polymer and the Tg of the second polymer. When the first polymer and the second polymer are miscible, they may have a single Tg between the Tg of the first polymer and the Tg of the second polymer. In yet another aspect of the invention, the first polymer and the second polymer are the same, but of different degrees of crosslinking and often, the first polymer has a higher degree of crosslinking than the second polymer, which has either a reduced degree of crosslinking or no crosslinking. In a preferred embodiment, particularly when applying foam to a surface, at least a portion of the spray gun nozzle is a polymer, which comprises a color-changeable additive, often a thermochromatic dye. In yet another embodiment, the first polymer is soluble in a solvent, and the second polymer is not soluble in that same solvent.

While the invention has been described with reference to certain embodiments, it will be understood by those skilled in the art that various changes may be made, and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An applicator for a pressurized two-component foam having a housing and a nozzle removably attached to a front of the housing which comprises:

an expanded rear portion of the nozzle for affixing the nozzle to a front of the housing employing a fastening means;

an egress segment of the nozzle at an opposed end from the expanded rear portion of the nozzle, the egress segment comprising:

a v-shaped or fan-shaped nozzle tip in longitudinal cross-section to the longitudinal axis of the nozzle tip and having a pair of outwardly divergent lips and a centrally-located aperture along the longitudinal axis of the nozzle tip at an egress end of the nozzle in longitudinal cross-section, the nozzle tip applying a foam or a coating in a first pattern;

a first nozzle segment rearward along a longitudinal axis of the v-shaped fan nozzle tip;

a fracture zone rearward along the longitudinal axis of the first nozzle segment;

a second nozzle segment rearward along the longitudinal axis of the fracture zone applying the foam in the second pattern is circular in cross-section after the first nozzle segment has been removed from the applicator at the fracture zone; wherein an internal diameter of the first nozzle segment and the second nozzle segment is substantially constant; and a terminal end of the fracture zone forming the second nozzle segment when the first nozzle segment is removed from the egress segment of the nozzle along the fracture zone, the second nozzle segment applying the foam or the coating in a second pattern, the second pattern being different from the first pattern in cross-section geometry at the fracture zone, the terminal end of the first nozzle segment being v-shaped in longitudinal cross-section with the pair of outwardly divergent lips and the terminal end of the second nozzle segment being circular in cross-section, by an operator applying opposing pivotable forces on either side of the fracture zone and snapping the first nozzle segment off the nozzle at the fracture zone, thereby exposing a second circular nozzle tip in cross-section at the terminal end of the second nozzle segment; and a static mixer interposed between a proximal end of the expanded rear portion of the nozzle and a distal end of the second nozzle segment, the static mixer having a plurality of mixing flights for facilitating the frothing reaction to synthesize the foam by a pressurized propellant which enters the static mixer as a liquid under pressure and changes to a gaseous state when the liquid is dispensed into a lower pressure ambient environment in the static mixer.

2. The applicator of claim 1 wherein
the fracture zone is a reduced thickness area between the first and second nozzle segments.

3. The applicator of claim 1 wherein
the entire first nozzle segment and entire second nozzle segment comprise entirely a first polymer and entirely a second polymer respectively.

4. The applicator of claim 3 wherein
the first polymer and the second polymer are at least partially miscible polymers, having at least one glass transition temperature (Tg) between the glass transition temperature (Tg) of the first polymer and the glass transition temperature (Tg) of the second polymer in the fracture zone.

5. The applicator of claim 4 wherein
the first polymer and the second polymer are miscible having a single glass transition temperature (Tg) between the glass transition temperature (Tg) of the first polymer and the glass transition temperature (Tg) of the second polymer, in the area of the applicator having single glass transition temperature (Tg) in the fracture zone.

6. The applicator of claim 3 wherein
a composition of the first polymer and the second polymer are of the same polymeric composition, but of different degrees of crosslinking.

7. The applicator of claim 6 wherein
the first polymer has a higher degree of crosslinking than the second polymer, which has either a reduced degree of crosslinking or no crosslinking.

8. The applicator of claim 1 wherein
at least a portion of the applicator is a polymer, which comprises a color-changeable additive.

9. The applicator of claim 8 wherein
the color-changeable additive is a thermochromatic dye.

10. The applicator of claim 3 wherein
the first polymer is soluble in a solvent, and the second polymer is not soluble in that same solvent.

* * * * *